Patented Mar. 18, 1952

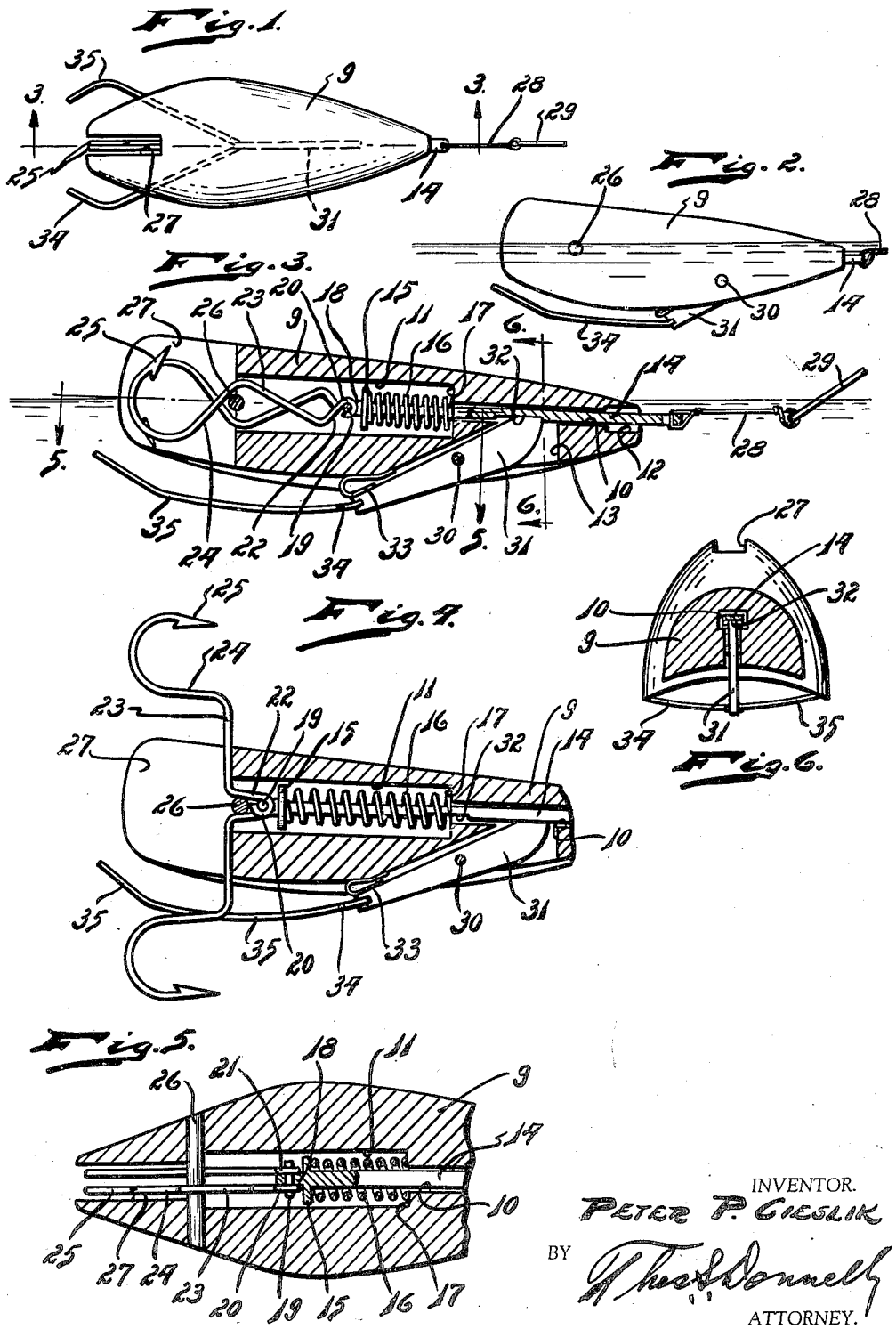

2,589,343

UNITED STATES PATENT OFFICE 2,589,343

FISH BAIT

Peter P. Cieslik, Detroit, Mich.

Application December 7, 1945, Serial No. 633,549

3 Claims. (Cl. 43—35)

My invention relates to a new and useful improvement in a fish bait and has for its object the provision of a fish bait so constructed and arranged that the hooks will be concealed until the fish strikes, whereupon the hooks will be released for embedding in the fish.

Another object of the invention is the provision of a fish bait having a body provided with a pivoted pawl which is adapted to engage a longitudinally slidable member and retain the fish hooks in concealed position until the pawl is released.

Another object of the invention is the provision of a fish bait of this class so constructed and arranged that upon the longitudinal movement of a member the hooks will be drawn inwardly of the body of the bait and brought into a concealing slot.

Another object of the invention is the provision of a fish bait of this class which will be simple in structure, economical of manufacture, durable, compact and highly efficient in use.

Other objects will appear hereinafter.

It is recognized that various modifications and changes may be made in the detail of structure illustrated without departing from the invention and it is intended that such variations and modifications shall be encompassed within the scope of the claims which form a part of this application.

Forming a part of this application are drawings in which,

Fig. 1 is a top plan view of the invention,

Fig. 2 is a side elevational view of the invention,

Fig. 3 is a sectional view taken on line 3—3 of Fig. 1, slightly enlarged,

Fig. 4 is a fragmentary view similar to Fig. 3, showing the hooks in operative position, Fig. 5 is a fragmentary sectional view taken on line 5—5 of Fig. 3, Fig. 6 is a sectional view taken on line 6—6 of Fig. 3.

As shown in the drawing the invention comprises a body 9 which is tapered toward both ends and which is provided with a longitudinally extending bore 10 opening into the enlarged bore 11 at one end and a slightly enlarged recess 12 at its opposite end. On the under surface the body 9 is provided with an inclined slot or recess 13. Slidably projected through the bores 10 and 11 is a rod 14 having an enlarged collar 15 preferably formed integral therewith against which bears one end of a coil spring 16 the other end of which bears against the end wall 17 of the bore 11. Projecting outwardly from the collar 15 is a tongue 18 through which is extended a pin 19 which also passes through the eyelets 20 and 21 formed on a pair of fish hooks. Each of these hooks is constructed as is the other and a description of one will suffice for both. As shown in Fig. 4 the eyelet 20 is formed on an angularly turned portion 22 of a shank 23 which carries the angularly turned portion 24 formed into the form of a hook and carrying the barb 25 at its end. Projected through the body 9 is a pin 26 which is positioned adjacent one end of and partially within the slot 27 which is formed in the rear end of the body 9. Attached to the forward end of the rod 14 is a leader 28 to which is attached the fish line 29.

Pivoted on pin 30 projected through the body 9 is a pawl or dog 31 which is adapted to engage at one end in the recess or notch 32 formed in the rod 14. This pawl or dog 31 is normally maintained rocked into engaging position with the rod 14 by means of the doubled-over leaf spring 33 which is attached at one end to the body 9. Secured rigidly to the rear end of the pawl or dog 31 and projecting outwardly therefrom are the spaced-apart arms 34 and 35 which are angularly turned adjacent their free ends and project beyond the end of the body 9.

In use, when the bait is in the water, whether the bait is used for casting, trolling, or still fishing, the bait would be in the position shown in Fig. 1 and Fig. 3. When the fish would strike, it would press the arms 34 and 35 inwardly toward the body 9 so as to rock the dog 31 out of the recess 32. When the dog disengages from the recess 32 the coil spring, which would be under compression, would move the rod 14 relatively to the body 9 into the position shown in Fig. 4 thus causing the hooks to project outwardly as shown in Fig. 4. It will be noted from Fig. 3 that when the hooks are in the position shown in Fig. 3 they are crossed relatively to each other. Should the fish strike and the hooks be projected outwardly into the position shown in Fig. 4 the fish of course would be brought into engagement with the barbs 25. Consequently, it is seen that normally the hooks are not exposed and that the bait is a body which may be easily swallowed or taken into the mouth of a fish without engaging the hooks but that as soon as the arm 34 or 35 is pressed inwardly toward the body 9 the hooks will spring outwardly to exposed position.

In order to return the hooks from the position shown in Fig. 4 to that shown in Fig. 3 it is but necessary while grasping the body 9 to pull on the line 29. This will draw the hooks inwardly and the portion 23 of the shank will engage the end of the bore 11 and be caused to rock on the pin 19 as a pivot and this engagement will continue until the hooks rest in engagement with the end of the bore 11 at their line of bend as clearly appears from Fig. 3. As the rod 14 moves in response to the expansion of the spring 16 after the dog has been released from the notch 32, should the hooks be inclined to remain in the position shown in Fig. 3, the pin 26 will function to spread the hooks apart into the position shown in Fig. 4. This pin also serves as an abutment to limit the sliding movement of the rod 14 in one direction. Experience has shown that a fish bait of this class is highly efficient in use and that once the dog is tripped the hooks are always positively moved into the outward position shown in Fig. 4. The hooks when drawn into the position shown in Fig. 3 are entirely concealed in the slot 27 which is formed in the end of the body 9.

What I claim is:

1. A fish bait of the class described, comprising: a body slitted at one end to provide a slot projecting inwardly thereof, said body having a bore formed therethrough, said bore being larger at one end than at the other and said larger end of said bore opening into said slot, there being formed inwardly from the opposite end of said body an inclined slot opening at one end into the smaller portion of said bore; a rod slidably projected through the smaller portion of said bore and terminating at one end in the larger portion of said bore; a radially projecting collar fixedly mounted on said rod inwardly from said end thereof; a tongue on said rod projecting beyond said collar and forming an extension of said rod; a coil spring embracing said rod and bearing at one end against one face of said collar and at its opposite end against the end wall of the larger portion of said bore; a pair of fish hooks pivotally connected at one end to said tongue and each being provided with a shank angularly turned intermediate its end, said rod having a recess formed in its periphery at the portion slidable in said smaller bore; a pawl rockably mounted in said inclined slot and adapted for engaging at one of its ends in said recess for releasably holding said rod against said slidable movement, upon movement of said rod in a direction to compress said spring, said hooks, upon sliding of said rod in a direction to compress said spring, engaging, at a portion of their shanks within the larger portion of said bore and the remaining portions of said looks contained within said first named slot; resilient means for normally maintaining said pawl in engagement with said recess; an arm projecting outwardly from said body and connected at one end to one end of said pawl for rocking said pawl to disengage the same from said recess; and a pin carried by said body and extending across the larger portion of said bore for engaging said hooks and spreading the same apart upon movement of said rod in response to the pressure of said spring.

2. A fish bait of the class described, comprising: a body slitted at one end to provide a slot projecting inwardly thereof, said body having a bore formed therethrough, said bore being larger at one end than at the other and said larger end of said bore opening into said slot, there being formed inwardly from the opposite end of said body an inclined slot opening at one end into the smaller portion of said bore; a rod slidably projected through the smaller portion of said bore and terminating at one end in the larger portion of said bore; a radially projecting collar fixedly mounted on said rod inwardly from said end thereof; a tongue on said rod projecting beyond said collar and forming an extension of said rod; a coil spring embracing said rod and bearing at one end against one face of said collar and at its opposite end against the end wall of the larger portion of said bore; a pair of fish hooks pivotally connected at one end to said tongue and each being provided with a shank angularly turned intermediate its end, said rod having a recess formed in its periphery at the portion slidable in said smaller bore; a pawl rockably mounted in said inclined slot and adapted for engaging at one of its ends in said recess for releasably holding said rod against said slidable movement, upon movement of said rod in a direction to compress said spring, said hooks, upon sliding of said rod in a direction to compress said spring, engaging, at a portion of their shanks within the larger portion of said bore and the remaining portions of said hooks contained within said first named slot; resilient means for normally maintaining said pawl in engagement with said recess; an arm projecting outwardly from said body and connected at one end to one end of said pawl for rocking said pawl to disengage the same from said recess; and a pin carried by said body and extending across the larger portion of said bore for engaging said hooks and spreading the same apart upon movement of said rod in response to the pressure of said spring, the pivoted terminal portion of each of said shanks overlying and engaging said pin.

3. A fish bait of the class described, comprising: a body slitted at one end to provide a slot projecting inwardly thereof, said body having a bore formed therethrough, said bore being larger at one end than at the other and said larger end of said bore opening into said slot, there being formed inwardly from the opposite end of said body an inclined slot opening at one end into the smaller portion of said bore; a rod slidably projected through the smaller portion of said bore and terminating at one end in the larger portion of said bore; a radially projecting collar fixedly mounted on said rod inwardly from said end thereof; a tongue on said rod projecting beyond said collar and forming an extension of said rod; a coil spring embracing said rod and bearing at one end against one face of said collar and at its opposite end against the end wall of the larger portion of said bore; a pair of fish hooks pivotally connected at one end to said tongue and each being provided with a shank angularly turned intermediate its end, said rod having a recess formed in its periphery at the portion slidable in said smaller bore; a pawl rockably mounted in said inclined slot and adapted for engaging at one of its ends in said recess for releasably holding said rod against said slidable movement, upon movement of said rod in a direction to compress said spring, said hooks, upon sliding of said rod in a direction to compress said spring, engaging, at a portion of their shanks within the larger portion of said bore and the remaining portions of said hooks contained within said first named slot; resilient means for normally maintaining said pawl in engagement with said recess; an arm projecting outwardly from said body and connected at one end to one end of said pawl for rocking said pawl to disengage the same from said recess; and a pin carried by said body and extending across the larger portion of said bore for engaging said hooks and spreading the same apart upon movement of said rod in response to the pressure of said spring, the pivoted terminal portion of each of said shanks overlying and engaging said pin, and the angularly turned portion of said shanks engaging the bottom of said first named slot.

PETER P. CIESLIK.

REFERENCES CITED

The following references are of record in the file of this patent:

UNITED STATES PATENTS

| Number | Name | Date |
|---|---|---|
| 610,098 | Sly | Aug. 30, 1898 |
| 635,547 | Howard | Oct. 24, 1899 |
| 1,318,072 | Gottschalk | Oct. 7, 1919 |
| 1,318,073 | Gottschalk | Oct. 7, 1919 |
| 1,372,831 | Roderick | Mar. 29, 1921 |
| 1,812,906 | Swearingen | July 7, 1931 |